(12) United States Patent
Chrien

(10) Patent No.: US 11,047,742 B2
(45) Date of Patent: Jun. 29, 2021

(54) COHERENT LIGHT DETECTION SYSTEM AND METHOD

(71) Applicant: The Boeing Company, Chicago, IL (US)

(72) Inventor: Thomas G. Chrien, Rancho Palos Verdes, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/687,829

(22) Filed: Nov. 19, 2019

(65) Prior Publication Data

US 2021/0148764 A1    May 20, 2021

(51) Int. Cl.
*G01J 9/02* (2006.01)
*G01J 3/42* (2006.01)

(52) U.S. Cl.
CPC ....... *G01J 9/0246* (2013.01); *G01J 2003/423* (2013.01); *G01J 2009/0238* (2013.01); *G01J 2009/0253* (2013.01)

(58) Field of Classification Search
None
See application file for complete search history.

(56) References Cited

U.S. PATENT DOCUMENTS

| | | | |
|---|---|---|---|
| 3,824,018 A | 7/1974 | Crane | |
| 4,170,416 A | 10/1979 | Fencil | |
| 5,151,585 A | 9/1992 | Siebert | |
| 6,151,114 A | 11/2000 | Russell | |
| 8,907,261 B1 | 12/2014 | Wishstar | |
| 2006/0109476 A1* | 5/2006 | Werner | G01B 9/02035 356/477 |

(Continued)

FOREIGN PATENT DOCUMENTS

DE    19851010 A1    6/2007

OTHER PUBLICATIONS

Bartels, R. A., et al. "Absolute determination of the wavelength and spectrum of an extreme-ultraviolet beam by a Young's double-slit measurement." Optics letters 27.9 (2002): 707-709. (Year: 2002).*

(Continued)

*Primary Examiner* — Shawn Decenzo
(74) *Attorney, Agent, or Firm* — Parsons Behle & Latimer

(57) ABSTRACT

A method for detecting coherent light that includes configuring a spatial interferometer, receiving the coherent light through the spatial interferometer, and disposing a photo detector adjacent to the spatial interferometer. The spatial interferometer is configured such that a coherent light passing through the spatial interferometer interferes with itself. The interference of the coherent light with itself creates a light fringe. The light fringe projects onto the photo detector. The photo detector has an array of pixels operable to detect an intensity of coherent light. The array of pixels provides a plurality of outputs corresponding to coherent light received by discrete pixels of the array of pixels. The method includes determining an interference pattern of the light fringe based on the plurality of outputs of the array of pixels, and determining one or more wavelengths of the coherent light from the interference pattern.

20 Claims, 4 Drawing Sheets

(56) References Cited

U.S. PATENT DOCUMENTS

| | | | |
|---|---|---|---|
| 2006/0154156 A1* | 7/2006 | Farah | G01B 9/02032 |
| | | | 430/5 |
| 2006/0164649 A1* | 7/2006 | Rosengaus | G01J 3/0224 |
| | | | 356/450 |
| 2011/0125460 A1* | 5/2011 | Suzuki | H04B 10/90 |
| | | | 702/179 |
| 2012/0307258 A1* | 12/2012 | Koerner | G01B 9/02032 |
| | | | 356/497 |
| 2019/0025476 A1* | 1/2019 | Sun | G02B 6/29388 |

OTHER PUBLICATIONS

Cohen, Jonathan D., "Electrooptic detector of temporally coherent radiation," Applied Optics, vol. 30, No. 7, Mar. 1, 1991.

Satorius, D. A. and Dimmick, T. E., "Imaging Detector of Temporally Coherent Radiation," Applied Optics, vol. 36, No. 13, May 1, 1997.

European Patent Office; Extended European Search Report for Application No. 20208357.2 dated Apr. 12, 2021.

\* cited by examiner

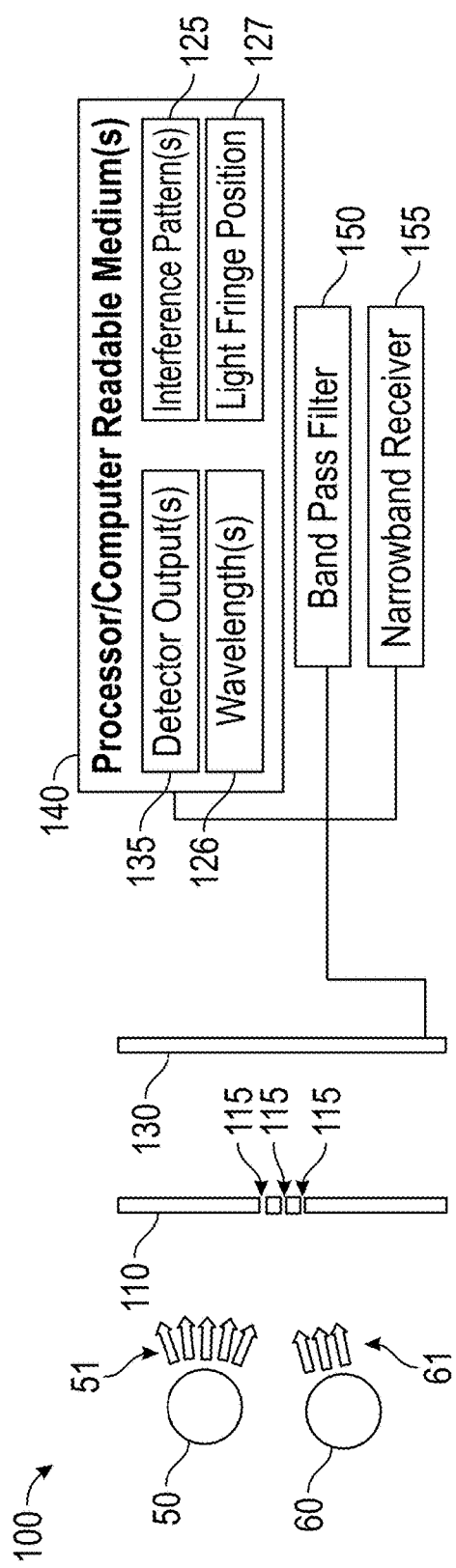
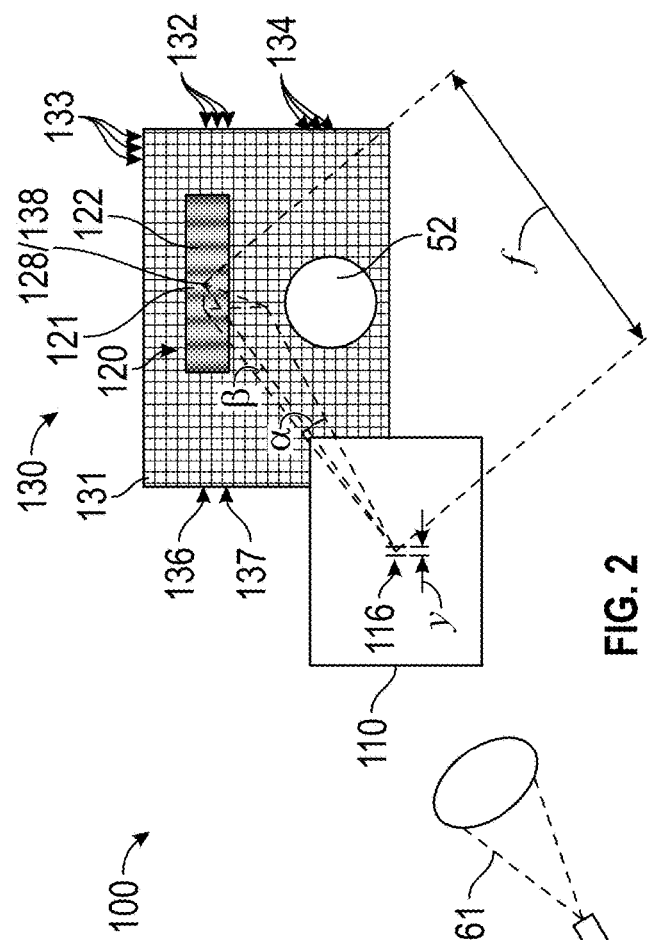
FIG. 1
FIG. 2

COHERENT LIGHT DETECTION SYSTEM AND METHOD

FIELD OF THE DISCLOSURE

The disclosure herein relates to light detection. More particularly, the disclosure relates to systems and methods of detecting coherent light in the presence of high-intensity light, such as sunlight.

BACKGROUND

Known coherence detection methods make use of temporal scanning of optical path differences to detect the presence of coherent light. With temporal scanning, received light is divided into multiple legs and rejoined with a time delay in one of the legs. As a result, the signal modulates over time. However, temporal scanning systems are not effective with short pulsed lasers that are discontinuous over time, such as ultra-short laser pulses. Furthermore, temporal scanning may be ineffective in the presence other high-intensity light. In particular, temporal scanning may be ineffective for detection of coherent light in space or high orbit, where high-intensity sunlight is near a boresight of a sensor and/or wavelengths have not been filtered by the atmosphere of a planet. Other disadvantages of known coherence detection methods and systems may exist.

SUMMARY

The present disclosure is directed to methods and systems that overcome or lessen some of the problems and disadvantages discussed above. Not all examples provide the same advantages or the same degree of advantage.

One example is a method for detecting coherent light that includes configuring a spatial interferometer, receiving the coherent light through the spatial interferometer, and disposing a photo detector adjacent to the spatial interferometer. The spatial interferometer is configured such that a coherent light passing through the spatial interferometer interferes with itself. The interference of the coherent light with itself creates a light fringe. The light fringe projects onto the photo detector. The photo detector has an array of pixels operable to detect an intensity of coherent light. The array of pixels provides a plurality of outputs corresponding to coherent light received by discrete pixels of the array of pixels. The method includes integrating the plurality of outputs of the array of pixels over a discrete time period using a processor, determining an interference pattern of the light fringe based on the plurality of outputs of the array of pixels, and determining one or more wavelengths of the coherent light from the interference pattern.

The spatial interferometer may have a plurality of openings. The coherent light passing through the plurality of openings interferes with itself to create the light fringe. The array of pixels includes a plurality of rows, a plurality of columns, and a plurality of diagonals. The method may include determining a directionality of the coherent light based on a position of the light fringe on the plurality of rows and the plurality of columns relative to the plurality of openings of the spatial interferometer. The photo detector may be a snapshot detector and integrating the plurality of outputs of the array of pixels may be simultaneously integrating the plurality of outputs of the array of pixels.

The method may include scanning, using the processor, at least one of the plurality of rows, the plurality of columns, or the plurality of diagonals for a first interference pattern and a second interference pattern. The first interference pattern is repetitive of the second interference pattern. The determining one or more wavelengths of the coherent light from the interference pattern may include applying a Fourier transform to the plurality of outputs of the plurality of rows of the array of pixels to determine a wavelength frequency of a corresponding row of the plurality of rows, and determining matching wavelength frequencies between adjacent rows of the plurality of rows.

The method may include identifying that the detection system is being illuminated by a laser, the laser being the coherent light. The method may include establishing a communication link with a source of the coherent light. The method may include directing a narrowband receiver toward the source of the coherent light. The spatial interferometer, the photo detector, and the processor may be positioned on a ground-based platform. The spatial interferometer, the photo detector, and the processor may be positioned on an air-based platform. The spatial interferometer, the photo detector, and the processor may be positioned on a space-based platform. The coherent light may be directed toward the space-based platform from a second space-based platform.

One example is a method for detecting coherent light. The method includes receiving a coherent light through a spatial interferometer, the coherent light interfering with itself to create a light fringe, receiving an incoherent light through the spatial interferometer, detecting the coherent light and the incoherent light on a photo detector adjacent to the spatial interferometer. The light fringe projects onto the photo detector. The method includes using a processor, determining an interference pattern of the light fringe based on the plurality of outputs of the array of pixels, and using the processor, determining one or more wavelengths of the coherent light from the interference pattern.

The spatial interferometer, the photo detector, and the processor may be positioned on a space-based platform. The method may include emitting the coherent light as a laser and establishing a laser communication link with a source of the laser.

One example is a coherent light detection system including a spatial interferometer, a photo detector, and a processor. The photo detector is positioned to receive a coherent light passing through the spatial interferometer. The photo detector has an array of pixels operable to detect coherent light. The processor is operable to integrate the array of pixels and determine an interference pattern of the coherent light received through the spatial interferometer. The processor is further operable to determine one or more wavelengths of the coherent light from the interference pattern.

The spatial interferometer may have a plurality of openings positioned such that the coherent light passing through the plurality of openings interferes with itself to create a light fringe. The plurality of openings may be a plurality of pinhole openings.

The array of pixels includes a plurality of rows, a plurality of columns, and a plurality of diagonals. The processor may be operable to determine a directionality of the coherent light by determining a position of the interference pattern on the plurality of rows and the plurality of columns, and calculating an angle of the position of the light fringe relative to the plurality of openings of the spatial interferometer. The processor may be operable to identify when the photo detector is being illuminated by a laser. The laser may be the coherent light. The spatial interferometer, the photo detector, and the processor may be positioned on a space-based platform.

BRIEF DESCRIPTION OF THE DRAWINGS

FIG. 1 shows an example of a coherent light detection system.

FIG. 2 shows an example of a coherent light detection system and a light fringe.

Figure 3:
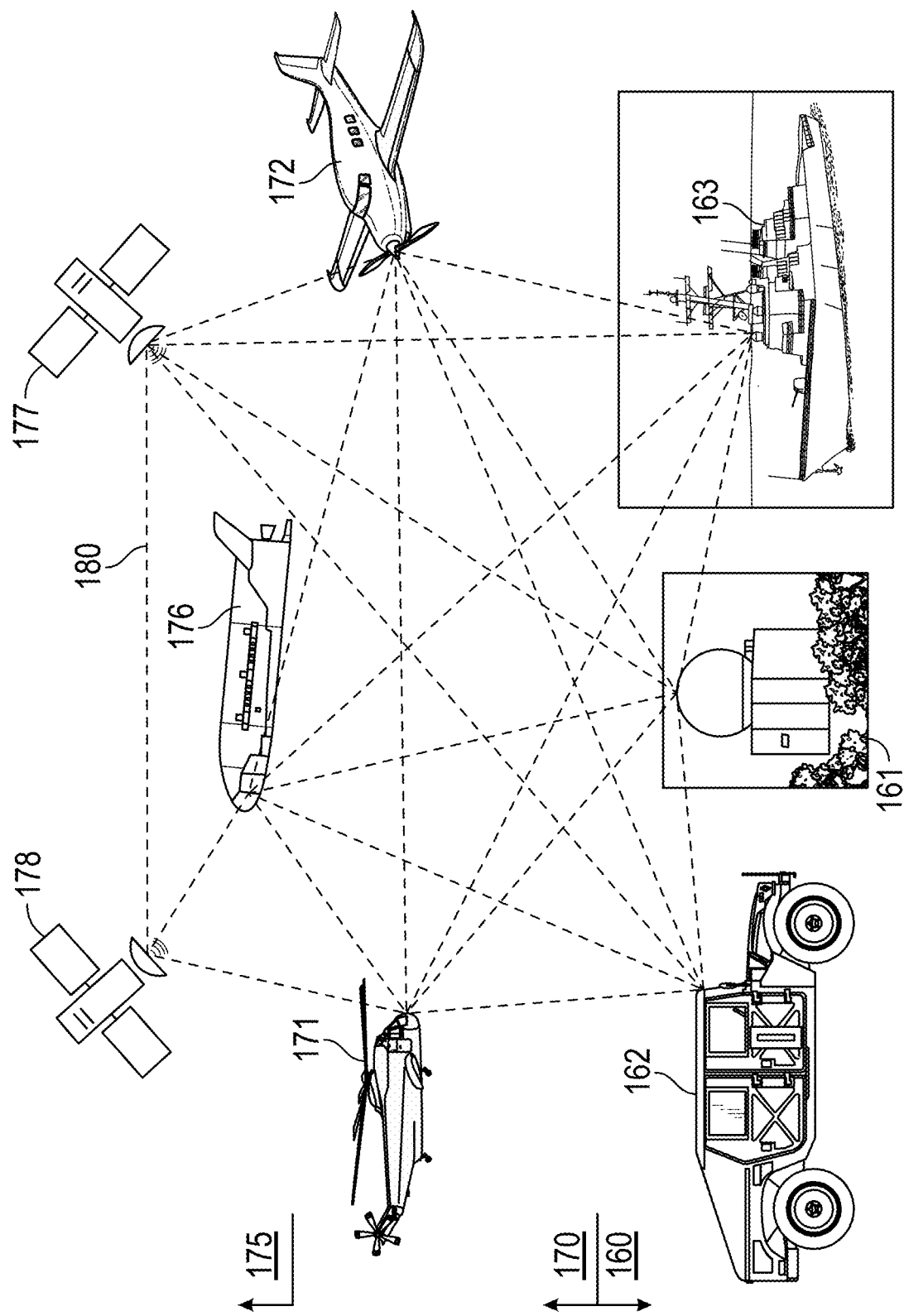
FIG. 3 is an environment diagram of platforms incorporating a coherent light source and/or a coherent light detection system.

While the disclosure is susceptible to various modifications and alternative forms, specific examples have been shown. The features, functions, and advantages that have been discussed can be achieved independently in various examples or may be combined in yet other examples further details of which can be seen with reference to the drawings and the following description. However, it should be understood that the disclosure is not intended to be limited to the particular forms disclosed. Rather, the intention is to cover all modifications, equivalents and alternatives falling within the scope of the disclosure as defined by the appended claims.

DETAILED DESCRIPTION

FIG. 1 shows an example of a coherent light detection system 100. The coherent light detection system 100 includes a spatial interferometer 110, a photo detector 130 positioned to receive a portion of a coherent light 61 passing through the spatial interferometer 110, and a processor 140 with one or more computer readable mediums. The coherent light 61 is emitted from a coherent light source 60. The coherent light 61 may be a laser. An incoherent light source 50, such as the sun, may also emit an incoherent light 51 with a high intensity. A portion of the incoherent light 51 may also be received through the spatial interferometer 110. The coherent light 61 passing through the spatial interferometer 110 interferes with itself to create a light fringe 120 (shown in FIG. 2). The coherent light detection system 100 may have no moving components.

In some examples, the spatial interferometer 110 includes a plurality of openings 115. The plurality of openings 115 may be more than two openings 115, such as three or more openings 115. The plurality of openings 115 may be pinhole openings. The more than two openings 115 may be spatially separated in two dimensions. The use of more than two pinhole openings may be advantageous in some applications to increase accuracy. By way of example, the spatial interferometer 110 may be a Young's Double slit, a Lloyd's mirror, a Sagnac interferometer, or a zone-plate interferometer.

The photo detector 130 is operable to detect the coherent light 61 and determine an interference pattern 125 corresponding to the light fringe 120 (shown in FIG. 2). The processor 140 determines one or more wavelengths 126 that exist within the coherent light 61 from the interference pattern 125. The processor 140 also determines the position 127 of the light fringe 120 (shown in FIG. 2) on the photo detector 130.

The coherent light detection system 100 may include a spectral filter, such as a band pass filter 150, to allow only frequencies within a certain range to reach the spatial interferometer 110. The band pass filter 150 may narrow the spectral range of the interfered coherent light 61 to wavelengths that are being monitored by the coherent light detection system 100. The band pass filter 150 may be a high pass filter with a color lens to pass wavelengths of an expected color of a coherent light 61. The coherent light detection system 100 may include a narrowband receiver 155. The narrowband receiver 155 may be utilized to receive communications and reject noise and interference outside its narrow bandwidth.

FIG. 2 shows an example of a coherent light detection system 100 creating a light fringe 120 from coherent light 61 in the presence of incoherent light 51. For purposes of illustration, only portions of the incoherent light 51 directed towards the spatial interferometer 110 have been shown. The plurality of openings 115 (shown in FIG. 1) of the spatial interferometer 110 may be a pair of slits 116 to form a Young's Double slit, as shown in FIG. 2. A projection 52 of the incoherent light 51 is received onto the photo detector 130 in addition to the light fringe 120. For purposes of illustration, the relative sizes and intensities of light upon the photo detector 130 have been exaggerated.

The photo detector 130 is formed of an array of pixels 131, including a plurality of rows 132, a plurality of columns 133, and a plurality of diagonals 134. Each pixel 131 is operable to detect an intensity of coherent light 61. The array of pixels 131 provides a plurality of outputs 135 (shown in FIG. 1) corresponding to the intensities measured by the array of pixels 131. As coherent light 61 is received through the pair of slits 116 of the spatial interferometer 110, the coherent light 61 interferes with itself to form a light fringe 120 consisting of alternating sections of constructive interference 121 and destructive interference 122. In some examples, the slits 116 may be pinholes. The sections of constructive interference 121 have a greater intensity than the sections of destructive interference 122. The light fringes 120 will not be uniform over the array of pixels 131 due to their location relative to the spatial interferometer 110. In addition, in some examples, the projection 52 of the incoherent light 51 may overlap with the light fringe 120 created by the interfering coherent light 61. However, the pattern of alternating sections of constructive interference 121 and destructive interference 122 will remain.

The photo detector 130 may be a snapshot detector that integrates the plurality of outputs 135 of the array of pixels 131 simultaneously over the same time period. In a snapshot detector, a shutter opens for a short period to allow light to pass. The plurality of outputs 135 of the array of pixels 131 may be generated on a frame-by-frame basis. The shutter may be momentarily closed to refresh the frame. In some examples, a shutter speed of the snapshot detector may be at least temporarily modified. The modification of the shutter speed may be advantageous in the event that illumination by a laser is synced to the time that the shutter is closed.

The processor 140 (shown in FIG. 1) is operable to integrate the outputs 135 of the array of pixels 131 and determine an interference pattern 125 corresponding to the light fringe 120. The interference pattern 125 includes properties of the light fringe 120 such as the relative brightness of sections of constructive interference 121 and destructive interference 122, and the relative position of sections of constructive interference 121 and destructive interference 122. As illustrated in FIG. 2, the light fringe 120 extends across multiple rows 132 of the array of pixels 131. A first interference pattern corresponds to the outputs 135 of a first row 136 of pixels 131 and a second interference pattern corresponds to the outputs 135 of a second row 137 of pixels 131 that is adjacent to the first row 136. The first interference pattern is repetitive of the second interference pattern.

The processor 140 is operable to determine one or more wavelengths 126 of the coherent light 61 from the interference pattern 125. The processor 140 includes an algorithm to scan across rows 132, columns 133, and/or diagonals 134 of the photo detector 130 to detect patterns of brightness and darkness from a light fringe 120. The processor 140 may determine a wavelength 126 by applying a Fourier transform to the plurality of outputs 135 of the pixels 131 of the photo detector 130. The Fourier transform may be applied by discrete rows 132, columns 133, or diagonals 134 of the photo detector 130 to determine a frequency of the wavelength within the rows 132, columns 133, or diagonals 134. The processor 140 matches frequencies in the interference patterns 125 of the light fringes 120 of adjacent rows 132, columns 133, or diagonals 134. The presence of similar or identical frequencies in adjacent rows 132, columns 133, or diagonals 134 provides a higher level of confidence that a coherent light 61 having a particular wavelength is being received by the spatial interferometer 110.

The processor 140 is operable to determine a directionality of the coherent light 61. The processor 140 may determine the directionality by determining the position 127 of the light fringe 120 on the array of pixels 131 of the photo detector 130. The directionality of the coherent light 61 is calculated based on the rows 132 and columns 133 of interference light angled from the spatial interferometer 110. Depending upon the row 132 and column 133 relative to the plurality of openings 115, such as slits 116, the directionality of the coherent light 61 can be determined.

The photo detector 130 has a focal distance f from the slits 116 of the spatial interferometer 110 to a focal point 138 on the photo detector 130. Depending on the location and orientation of the coherent light source 60, the light fringe 120 may be vertically and/or horizontally displaced along the photo detector 130. Likewise, the light fringe 120 may be rotated relative to the rows 132 of pixels 131 of the photo detector 130. In some examples, a center 128 of the light fringe 120 may be determined by the section of constructive interference 121 having the greatest intensity and/or the point about which the light fringe 120 is symmetrical. The center 128 of the light fringe 120 relative to the focal point 138 forms a vertical offset angle α and a horizontal offset angle β relative to the slits 116 of the spatial interferometer 110. The vertical offset angle α and horizontal offset angle β may be used to triangulate a location of the coherent light source 60.

In some examples, the plurality of openings 115 may be two pinhole openings. The aperture size of the pinhole openings may be optimized for the environment where coherent light is being detected. A large aperture size may result in an image that is unclear because too many rays of light may be received upon the photo detector 130, which causes spreading and blurring. A smaller aperture size increases the sharpness of the image by restricting the rays of light received upon the photo detector, which deceases the spread of the light. An optimal aperture size may be selected by the formula $d=2\sqrt{f\lambda}$, where d is the aperture diameter, f is the focal length (distance from pinhole opening to image plane on the photo detector 130) and λ, is the wavelength of light. The aperture size may be selected based upon an expected wavelength of light to be detected in the desired application. The linear separation between sections of constructive interference 121 is given by the equation $\Delta_y=f\lambda/y$, where f is the focal length and y is the separation between the slits 116.

A slit separation y may be selected based upon the expected wavelength of the coherent light 61 that is desired to be detected. It is desired that a light fringe 120 extend across at least a plurality of pixels 131 so that the shortest wavelength is within the size of the photo detector 130. In some examples, if the photo detector 130 receives coherent light 61 having wavelengths 126 of 1-2 microns, it may be desired that the light fringe 120 be no finer than ten pixels 131 in width. The slit separation y and focal length f may be selected to optimize detection of desired wavelengths.

The coherent light detection system 100 may be utilized in a variety of locations. FIG. 3 is an environment diagram of platforms incorporating one or both of a coherent light source 60 and a coherent light detection system 100 (shown in FIG. 1). A coherent light source 60 and/or a coherent light detection system 100 may be incorporated into a ground-based platform 160 or an air-based platform 170. The air-based platform 170 may be a space-based platform 175. By way of example, a ground-based platform 160 may be structure 161, such as a radar installation, a vehicle 162, such as an armored vehicle, or a water-going vessel 163, such as a naval ship. By way of example, an air-based platform 170 may be a helicopter 171, an airplane 172, or another non-ground-based platform such as a missile. A space-based platform 175 may be a spacecraft 176 or one or more satellites 177, 178. A space-based platform 175 may particularly benefit from the examples of the coherent light detection system 100 (shown in FIG. 1) described herein due to the presence of high-intensity sunlight that has not been filtered fully by the Earth's atmosphere and/or the sunlight is near a boresight of a sensor. A laser communication link 180 may be formed between two platforms, such as between a first satellite 177 and a second satellite 178.

Depending on the desired use, a platform may emit a coherent light towards another platform. Dashed lines are used to illustrate a path of coherent light and/or a communications link between two platforms. The coherent light detection system 100 (shown in FIG. 1) on the receiving platform detects the presence of the coherent light. As a result, the platform may take appropriate action.

By way of example, coherent light may demonstrate that the platform is being illuminated undesirably by coherent light. The processor 140 is operable to identify when the photo detector 130 is being illuminated by a laser, such as a laser guidance system, and provide an alert. In some instances, coherent light may be used to establish a communications link with a second platform. For example, the spatial interferometer 110, the photo detector 130, and the processor 140 may be positioned on a space-based platform 175, such as a first satellite 177. A second satellite 178 may seek to establish a laser communication link 180 with the first satellite 177. The second satellite 178 directs a beam of coherent light, such as a laser, towards the first satellite 177, which is then received through the spatial interferometer 110 and to the photo detector 130 on the first satellite 177. The processor 140 determines a directionality of the beam of coherent light and redirects a narrowband receiver 155 (shown in FIG. 1) towards the second satellite 178 to form a communications link. Similarly, a beam of coherent light could be directed between a ground-based platform 160 and another ground-based platform 160, an air-based platform 170, or a space-based platform 175. Likewise, a beam of coherent light could be directed between an air-based platform 170 and another air-based platform 170 or, more particularly, a space-based platform 175.

Figure 4:
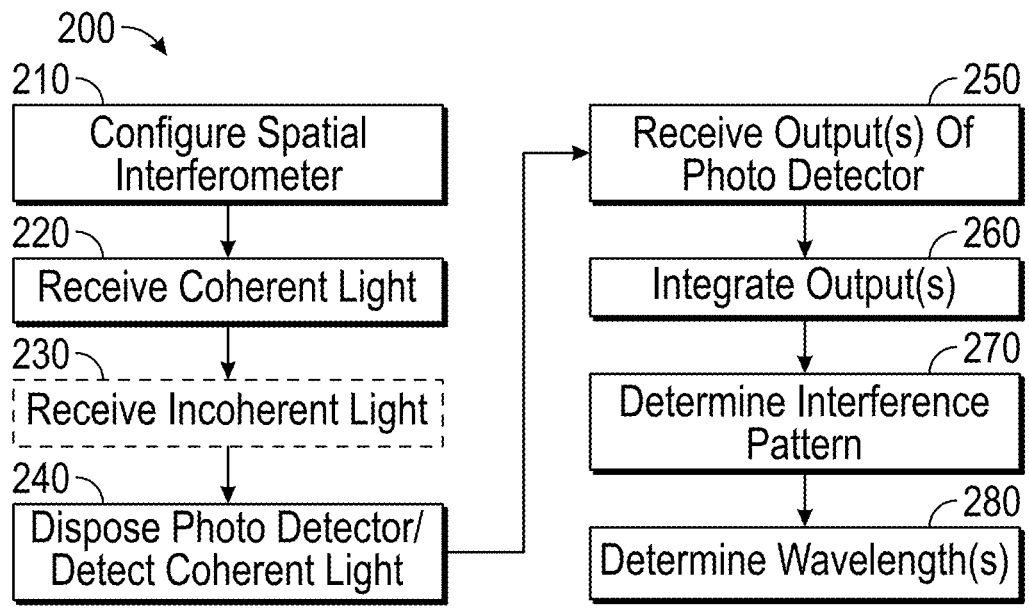
FIG. 4 is a flow chart of an example of a method for detecting coherent light.

FIG. 4 is a flow chart of an example of a method 200 for detecting coherent light 61. The method 200 includes Action 210 of configuring a spatial interferometer 110 such that a coherent light 61 passing through the spatial interferometer 110 interferes with itself, the interference of the coherent light 61 with itself creating a light fringe 120. The method 200 includes receiving the coherent light 61 through the spatial interferometer 110 in Action 220. In some examples, the method 200 may include receiving an incoherent light 51 through the spatial interferometer 110 in Action 230.

Action 240 of method 200 includes disposing a photo detector 130 adjacent to the spatial interferometer 110. The light fringe 120 projects onto the photo detector 130. The photo detector has an array of pixels 131 operable to detect coherent light 61. The intensity of the detected coherent light 61 causes the array of pixels 131 to provide a plurality of outputs 135 corresponding to coherent light 61 received by each of the pixels 131. The plurality of outputs 135 of the photo detector 130 are received by the processor 140 in Action 250. The method 200 includes Action 260 of integrating the plurality of outputs 135 of the array of pixels 131 over a discrete time period using the processor, and determining an interference pattern 125 of the light fringe 120 based on the plurality of outputs 135 of the array of pixels 131 in Action 270. The method 200 includes determining one or more wavelengths 126 of the coherent light 61 from the interference pattern 125 in Action 280.

Figure 5:
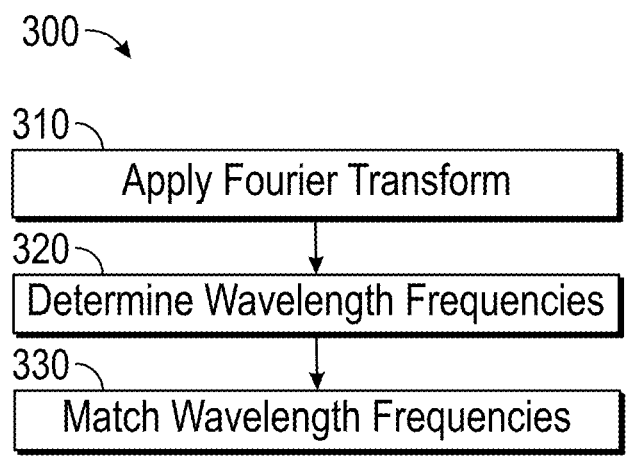
FIG. 5 is a flow chart of an example of a method for determining one or more wavelengths of a coherent light from an interference pattern.

FIG. 5 is a flow chart of an example of a method 300 for determining one or more wavelengths 126 of a coherent light 61 from an interference pattern 125 of a light fringe 120. The method 300 includes applying a Fourier transform to the plurality of outputs 135 of the plurality of rows 132 of the array of pixels 131 in Action 310 and determining a frequency of the wavelength 126 of each row 132 of the plurality of rows 132 in Action 320. In Action 320, the processor 140 may scan the plurality of rows 132, the plurality of columns 133, and/or the plurality of diagonals 134 for interference patterns 125. The method 300 includes Action 330 of matching wavelength frequencies between adjacent rows 132 of the plurality of rows 132.

Figure 6:
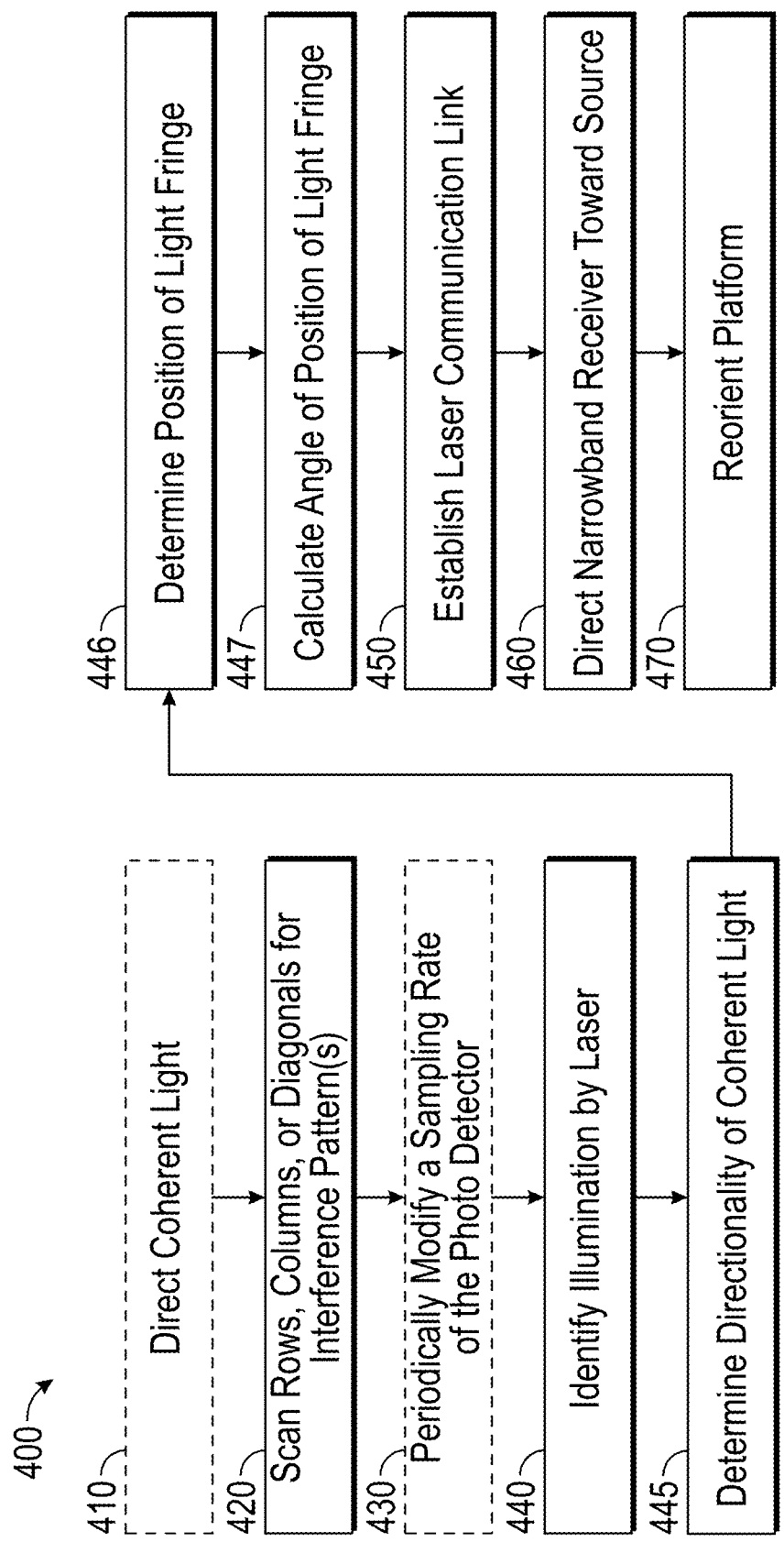
FIG. 6 is a flow chart of an example of a method for detecting and using coherent light.

FIG. 6 is a flow chart of an example of a method 400 for detecting and using coherent light 61. The method 400 includes Actions 410-470. Action 410 includes directing coherent light 61 towards a coherent light detection system 100 having a spatial interferometer 110, a photo detector 130 positioned to receive a portion of the coherent light 61 passing through the spatial interferometer 110, and a processor 140. Coherent light 61 is received through the spatial interferometer 110 and interferes with itself to create a light fringe 120 on the photo detector 130. Directing the coherent light 61 may include emitting the coherent light 61 as a laser. Directing the coherent light 61 may include directing the coherent light 61 from a ground-based platform 160, an air-based platform 170, or a space-based platform 175 to a ground-based platform 160, an air-based platform 170, or a space-based platform 175. The method may include directing the coherent light 61 toward a satellite 177 from a second satellite 178. Action 420 includes scanning, using the processor, at least one of the plurality of rows 132, the plurality of columns 133, or the plurality of diagonals 134 for a first interference pattern and a second interference pattern. The first interference pattern is repetitive of the second interference pattern.

Method 400 may include Action 430 of periodically modifying a sampling rate of the photo detector 130. Action 440 includes identifying that the coherent light detection system 100 is being illuminated by coherent light 61, such as a laser. Identifying that the coherent light detection system 100 is being illuminated by coherent light 61 may include Action 445 of determining a directionality of the coherent light 61. Determining a directionality of the coherent light 61 may include Action 446 of determining a position 127 of the light fringe 120 and corresponding interference pattern 125 on the plurality of rows 132 and the plurality of columns 133 relative to the plurality of openings 115, such as slits 116, of the spatial interferometer 110. Determining a directionality of the coherent light 61 may also include Action 447 of calculating a vertical offset angle α and/or a horizontal offset angle β of the position 127 of the light fringe 120 relative to the plurality of openings 115 of the spatial interferometer 110. The vertical offset angle α and horizontal offset angle β indicate the directionality of the coherent light 61.

Action 450 includes establishing a laser communication link 180 with the coherent light source 60. Action 460 includes directing a narrowband receiver 155 toward the coherent light source 60. Action 470 includes reorienting a platform carrying the coherent light detection system 100. The platform may reorient in response to information received through the laser communication link 180. The platform may reorient in response to an alert that the coherent light detection system 100 is being illuminated.

The features, actions, and advantages discussed with respect to Method 200, Method 300, and Method 400 can be achieved independently or in combination with each other. For example, Method 300 for determining one or more wavelengths 126 of a coherent light 61 from an interference pattern 125 may comprise Action 280 of Method 200. Also for example, Method 200 may be practiced in conjunction with Method 400, such as to assist in identifying illumination by coherent light 61, such as a laser, in Action 440.

Although this disclosure has been described in terms of certain preferred examples, other examples that are apparent to those of ordinary skill in the art, including examples that do not provide all of the features and advantages set forth herein, are also within the scope of this disclosure. Accordingly, the scope of the present disclosure is defined only by reference to the appended claims and equivalents thereof

What is claimed is:
1. A method for detecting coherent light comprising:
configuring a spatial interferometer such that a coherent light passing through the spatial interferometer interferes with itself and creates a light fringe, wherein the spatial interferometer has a plurality of openings, the coherent light passing through the plurality of openings interferes with itself to create the light fringe;
receiving the coherent light through the spatial interferometer;
disposing a photo detector adjacent to the spatial interferometer, the light fringe projecting onto the photo detector, the photo detector having an array of pixels operable to detect coherent light, the array of pixels providing a plurality of outputs corresponding to coherent light received by discrete pixels of the array of pixels, wherein the array of pixels includes a plurality of rows, a plurality of columns, and a plurality of diagonals;
integrating the plurality of outputs of the array of pixels over a time period using a processor;
determining an interference pattern of the light fringe based on the plurality of outputs of the array of pixels;

determining one or more wavelengths of the coherent light from the interference pattern; and determining a directionality of the coherent light based on a position of the interference pattern on the plurality of rows and the plurality of columns relative to the plurality of openings of the spatial interferometer.

2. The method of claim 1, further comprising scanning, using the processor, at least one of the plurality of rows, the plurality of columns, or the plurality of diagonals for a first interference pattern and a second interference pattern, the first interference pattern being repetitive of the second interference pattern.

3. The method of claim 1, wherein the photo detector is a snapshot detector and integrating the plurality of outputs of the array of pixels comprises simultaneously integrating the plurality of outputs of the array of pixels.

4. The method of claim 1, wherein determining one or more wavelengths of the coherent light from the interference pattern comprises:
applying a Fourier transform to each of the plurality of outputs of the plurality of rows of the array of pixels to determine a frequency of a wavelength of a corresponding row of the plurality of rows; and
determining matching wavelength frequencies between adjacent rows of the plurality of rows.

5. The method of claim 1, further comprising identifying that the photo detector is being illuminated by a laser, the laser being the coherent light.

6. The method of claim 5, further comprising establishing a laser communication link with a source of the coherent light.

7. The method of claim 6, further comprising directing a narrowband receiver toward the source of the coherent light.

8. The method of claim 6, further comprising:
receiving information through the laser communication link; and
reorienting a platform in response to the information received through the laser communication link, the platform carrying the spatial interferometer, the photo detector, and the processor.

9. The method of claim 5, wherein the spatial interferometer, the photo detector, and the processor are positioned on a space-based platform while receiving the coherent light through the spatial interferometer.

10. The method of claim 9, wherein the coherent light is directed toward the space-based platform from a second space-based platform.

11. The method of claim 1, wherein the coherent light is directed between a first platform and a second platform, the first platform being an air-based platform, and the second platform being an air-based platform or a ground-based platform.

12. The method of claim 1 further comprising periodically modifying a sampling rate of the photo detector.

13. A method for detecting coherent light comprising:
receiving a coherent light through a spatial interferometer, the coherent light interfering with itself to create a light fringe;
receiving an incoherent light through the spatial interferometer;
detecting the coherent light and the incoherent light on a photo detector adjacent to the spatial interferometer, the light fringe projecting onto the photo detector, the photo detector having an array of pixels operable to detect coherent light, the array of pixels providing a plurality of outputs corresponding to coherent light received by discrete pixels of the array of pixels;
using a processor, determining an interference pattern of the light fringe based on the plurality of outputs of the array of pixels; and
using the processor, determining one or more wavelengths of the coherent light from the interference pattern, wherein the spatial interferometer, the photo detector, and the processor are positioned on a space-based platform.

14. The method of claim 13, further comprising emitting the coherent light as a laser and establishing a laser communication link with a source of the laser.

15. The method of claim 14, further comprising directing a narrowband receiver toward the source of the coherent light.

16. The method of claim 14, further comprising:
receiving information through the laser communication link; and
reorienting the space-based platform in response to the information received through the laser communication link.

17. A coherent light detection system comprising:
a spatial interferometer, wherein the spatial interferometer has a plurality of openings positioned such that a coherent light passing through the plurality of openings interferes with itself to create a light fringe;
a photo detector positioned to receive the coherent light passing through the spatial interferometer, the photo detector having an array of pixels operable to detect coherent light, wherein the array of pixels includes a plurality of rows, a plurality of columns, and a plurality of diagonals; and
a processor operable to integrate the array of pixels and determine an interference pattern of the coherent light received through the spatial interferometer and determining one or more wavelengths of the coherent light from the interference pattern, and the processor is operable to determine a directionality of the coherent light by:
determining a position of the light fringe on the plurality of rows and the plurality of columns; and
calculating an angle ($\alpha$, $\beta$) of the position of the light fringe relative to the plurality of openings of the spatial interferometer.

18. The coherent light detection system of claim 17, wherein the plurality of openings is a plurality of pinhole openings.

19. The coherent light detection system of claim 17, wherein the processor is operable to identify when the photo detector is being illuminated by a laser, the laser being the coherent light.

20. The coherent light detection system of claim 17, wherein the spatial interferometer, the photo detector, and the processor are positioned on a space-based platform.

* * * * *